US012688771B2

(12) United States Patent
Gilson

(10) Patent No.: US 12,688,771 B2
(45) **Date of Patent: *Jul. 21, 2026**

(54) REMOTE CONTROL INTERFERENCE AVOIDANCE

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/919,762

(22) Filed: Oct. 18, 2024

(65) Prior Publication Data

US 2025/0054384 A1 Feb. 13, 2025

Related U.S. Application Data

(63) Continuation of application No. 18/459,680, filed on Sep. 1, 2023, now Pat. No. 12,148,290, which is a continuation of application No. 17/676,559, filed on Feb. 21, 2022, now Pat. No. 11,798,404, which is a continuation of application No. 16/677,256, filed on Nov. 7, 2019, now Pat. No. 11,295,607, which is a continuation of application No. 13/083,073, filed on Apr. 8, 2011, now Pat. No. 10,504,360.

(51) Int. Cl.
*G08C 19/16* (2006.01)
*G08C 23/04* (2006.01)

(52) U.S. Cl.
CPC ............ *G08C 19/16* (2013.01); *G08C 23/04* (2013.01)

(58) Field of Classification Search
CPC ................................ G08C 19/16; G08C 23/04
See application file for complete search history.

(56) References Cited

U.S. PATENT DOCUMENTS

| | | | |
|---|---|---|---|
| 3,806,654 | A | 4/1974 | Dooley et al. |
| 5,194,978 | A | 3/1993 | Heep |
| 5,682,157 | A | 10/1997 | Asmussen et al. |
| 5,848,054 | A | 12/1998 | Mosebrook et al. |
| 5,952,936 | A | 9/1999 | Enomoto |
| 5,982,761 | A | 11/1999 | Dutta |
| 6,333,937 | B1 | 12/2001 | Ryan |
| 6,529,556 | B1 | 3/2003 | Perdue et al. |

(Continued)

FOREIGN PATENT DOCUMENTS

| | | | | |
|---|---|---|---|---|
| CN | 103778770 A | * | 5/2014 | ............. G08C 17/02 |
| CN | 103136928 B | * | 7/2018 | ............. G08C 17/02 |

OTHER PUBLICATIONS

Directv, RF Setup (Remote) http://www.wkblog.com/tivo/wp-content/uploads/2008/06/hr21-rf-remote-7.jpg, 1 page, Jun. 2008.

*Primary Examiner* — Chico A Foxx
(74) *Attorney, Agent, or Firm* — Banner & Witcoff, Ltd.

(57) ABSTRACT

Computer readable media, methods and apparatuses may be configured for establishing a communication session between a computing device (e.g., a display device) and a remote control device using a signaling frequency. The computing device and the remote control device may be paired based on a pairing request and a pairing response message. The pairing request may comprise address data of the remote control device and address data of the computing device.

21 Claims, 10 Drawing Sheets

(56) References Cited

U.S. PATENT DOCUMENTS

| | | | |
|---|---|---|---|
| 6,687,487 | B1 | 2/2004 | Mosebrook et al. |
| 6,747,590 | B1 | 6/2004 | Weber |
| 6,769,129 | B1 | 7/2004 | Perlman |
| 6,803,857 | B1 | 10/2004 | Uehara et al. |
| 6,864,778 | B2 | 3/2005 | Musschebroeck et al. |
| 6,901,066 | B1 | 5/2005 | Helgeson |
| 7,035,644 | B1 | 4/2006 | Maruyama |
| 7,177,633 | B2 | 2/2007 | Ishiwatari |
| 7,532,611 | B1 | 5/2009 | Jacks, Jr. |
| 7,796,947 | B2 | 9/2010 | Kim |
| 8,081,649 | B2 * | 12/2011 | Cregg .................... H05B 47/19 375/257 |
| 8,130,079 | B2 | 3/2012 | McQuaide, Jr. et al. |
| 8,139,531 | B2 | 3/2012 | Li et al. |
| 8,150,411 | B2 | 4/2012 | Fischer |
| 8,255,756 | B2 | 8/2012 | Hoshi et al. |
| 8,411,807 | B1 | 4/2013 | Rangarajan et al. |
| 8,559,548 | B2 | 10/2013 | Yoshikawa et al. |
| 8,564,398 | B2 | 10/2013 | Kozlowski |
| 8,686,837 | B2 | 4/2014 | Larsen et al. |
| 8,736,427 | B2 | 5/2014 | King |
| 8,897,280 | B2 | 11/2014 | Husted et al. |
| 9,295,096 | B1 | 3/2016 | Shukla |
| 9,467,119 | B2 | 10/2016 | Lee et al. |
| 9,576,470 | B2 | 2/2017 | Jensen |
| 10,504,360 | B2 | 12/2019 | Gilson |
| 10,924,794 | B2 | 2/2021 | Lim et al. |
| 11,700,413 | B2 * | 7/2023 | McMahon ....... H04N 21/41265 348/734 |
| 2002/0196845 | A1 | 12/2002 | Richards et al. |
| 2004/0160338 | A1 | 8/2004 | Maxson et al. |
| 2004/0203474 | A1 | 10/2004 | Miller et al. |
| 2005/0054450 | A1 | 3/2005 | Yamaguchi |
| 2005/0085279 | A1 | 4/2005 | Aoki |
| 2005/0168470 | A1 | 8/2005 | Prabhakar et al. |
| 2006/0194507 | A1 | 8/2006 | Yamaguchi |
| 2006/0264185 | A1 | 11/2006 | Jorgensen |
| 2006/0279412 | A1 | 12/2006 | Holland et al. |
| 2007/0135178 | A1 | 6/2007 | Albulet et al. |
| 2007/0205911 | A1 | 9/2007 | Hanahara et al. |
| 2008/0008147 | A1 | 1/2008 | Nakayama |
| 2008/0101211 | A1 | 5/2008 | Rao |
| 2008/0161035 | A1 | 7/2008 | Tomioka et al. |
| 2008/0194278 | A1 | 8/2008 | Adkins |
| 2008/0298306 | A1 | 12/2008 | Larsson |
| 2009/0016289 | A1 | 1/2009 | Li et al. |
| 2009/0034481 | A1 | 2/2009 | Kuroda et al. |
| 2009/0052574 | A1 | 2/2009 | Li et al. |
| 2009/0132070 | A1 | 5/2009 | Ebrom et al. |
| 2009/0147893 | A1 | 6/2009 | Takahashi et al. |
| 2009/0238125 | A1 | 9/2009 | Karlsson et al. |
| 2009/0245803 | A1 | 10/2009 | Garner et al. |
| 2010/0008673 | A1 | 1/2010 | Nakamura |
| 2010/0052870 | A1 | 3/2010 | King |
| 2010/0080323 | A1 | 4/2010 | Mueck et al. |
| 2010/0109931 | A1 | 5/2010 | Esnard et al. |
| 2010/0248638 | A1 | 9/2010 | Harada et al. |
| 2010/0253623 | A1 | 10/2010 | Wei et al. |
| 2010/0259603 | A1 | 10/2010 | Mihara et al. |
| 2010/0302154 | A1 | 12/2010 | Lee et al. |
| 2010/0302461 | A1 | 12/2010 | Lim et al. |
| 2010/0315279 | A1 | 12/2010 | Hamai et al. |
| 2010/0332621 | A1 | 12/2010 | Ljunggren et al. |
| 2011/0025821 | A1 | 2/2011 | Curtis et al. |
| 2011/0064013 | A1 | 3/2011 | Liu et al. |
| 2011/0085612 | A1 | 4/2011 | Muraoka et al. |
| 2011/0102426 | A1 | 5/2011 | Moon et al. |
| 2011/0116502 | A1 | 5/2011 | Hamai |
| 2011/0205345 | A1 | 8/2011 | Choi et al. |
| 2011/0254722 | A1 | 10/2011 | Naiki |
| 2011/0254756 | A1 | 10/2011 | Lee et al. |
| 2011/0254933 | A1 | 10/2011 | Seo et al. |
| 2011/0268024 | A1 | 11/2011 | Jamp et al. |
| 2011/0285833 | A1 | 11/2011 | Tsurumoto et al. |
| 2011/0286340 | A1 | 11/2011 | Janecek et al. |
| 2012/0007968 | A1 | 1/2012 | Shintani |
| 2012/0050856 | A1 | 3/2012 | Shintani |
| 2012/0099450 | A1 | 4/2012 | Madan et al. |
| 2012/0136926 | A1 | 5/2012 | Dillon |
| 2012/0140839 | A1 | 6/2012 | Yoshikawa et al. |
| 2012/0154371 | A1 | 6/2012 | Mihara et al. |
| 2012/0176485 | A1 | 7/2012 | Miyauchi et al. |
| 2012/0177019 | A1 | 7/2012 | Zhang |
| 2012/0242455 | A1 * | 9/2012 | Hale ................ H04N 21/42204 340/10.1 |
| 2012/0257585 | A1 | 10/2012 | Sydor et al. |
| 2013/0223259 | A1 | 8/2013 | Pratt, Jr. et al. |
| 2013/0265144 | A1 | 10/2013 | Banna et al. |
| 2013/0314339 | A1 | 11/2013 | Ueki et al. |
| 2015/0296245 | A1 | 10/2015 | Toh et al. |
| 2016/0128062 | A1 | 5/2016 | Coffey et al. |
| 2018/0144620 | A1 | 5/2018 | Zhang et al. |
| 2020/0145714 | A1 * | 5/2020 | Danciu ................. H04L 67/142 |

* cited by examiner

REMOTE CONTROL INTERFERENCE AVOIDANCE

CROSS-REFERENCE TO RELATED APPLICATIONS

This application is a continuation of and claims priority to U.S. patent application Ser. No. 18/459,680, filed Sep. 1, 2023, which is a continuation of U.S. patent application Ser. No. 17/676,559, filed Feb. 21, 2022 (now U.S. Pat. No. 11,798,404), which is a continuation of U.S. patent application Ser. No. 16/677,256, filed Nov. 7, 2019 (now U.S. Pat. No. 11,295,607), which is a continuation of U.S. patent application Ser. No. 13/083,073, filed Apr. 8, 2011 (now U.S. Pat. No. 10,504,360), each of which is hereby incorporated by reference in its entirety.

BACKGROUND

Three dimensional (3D) televisions may produce a three dimensional (3D) image using one of two methods. Passive 3D televisions present a sequence of anaglyph images, and a user wears a pair of glasses each with a different colored lens, typically red and blue, to provide the illusion of depth. Active 3D televisions present a video signal that is a composite of two image sequences: a left eye image sequence and a right eye image sequence. Active 3D televisions send out a signal that is received by a pair of glasses, worn by a viewer, to synchronize shuttering of the lenses so that each eye may view only its intended sequence of images. The signal, however, may interfere with other devices, such as a remote control, that use similar signaling technology.

Further, some remote controls may transmit several signaling technologies, such as infrared and radio frequency (RF), when communicating with a television. As such, infrared (IR) transmissions from active 3D televisions may interfere with infrared transmissions by a remote control.

SUMMARY

The following presents a simplified summary in order to provide a basic understanding of some aspects as described herein. The summary is not an extensive overview of all aspects. It is neither intended to identify key or critical elements nor to delineate the scope of the present disclosure. The following summary merely presents various example concepts in a simplified form as a prelude to the more detailed description below.

According to some aspects, computer readable media, methods and apparatuses may be configured for determining a rate of signal pulses transmitted by a device and a transmission interval occurring between a first of the signal pulses and a second of the signal pulses, detecting selection of a command by a user, and transmitting at least a portion of the command during the transmission interval.

According to some aspects, computer readable media, methods and apparatuses may be configured for transmitting, by a display device, signal pulses at a pulse rate corresponding to a frame rate of a video program, transmitting, to a remote control, a message specifying the pulse rate and a time duration of a transmission interval between a pair of the signal pulses, and receiving, from the remote control, a command signal during the transmission interval.

According to some aspects, computer readable media, methods and apparatuses may be configured for detecting, by a device, a command packet sent by a remote control, determining that the command packet comprises an end sentinel followed by an identifier data sequence that identifies an alternative signaling frequency and comprises remote control address data of the remote control, causing transmission of a pairing request comprising the remote control address data and device address data of the device, and receiving a pairing response message from the remote control to establish a communication session with the remote control using the alternative signaling frequency.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
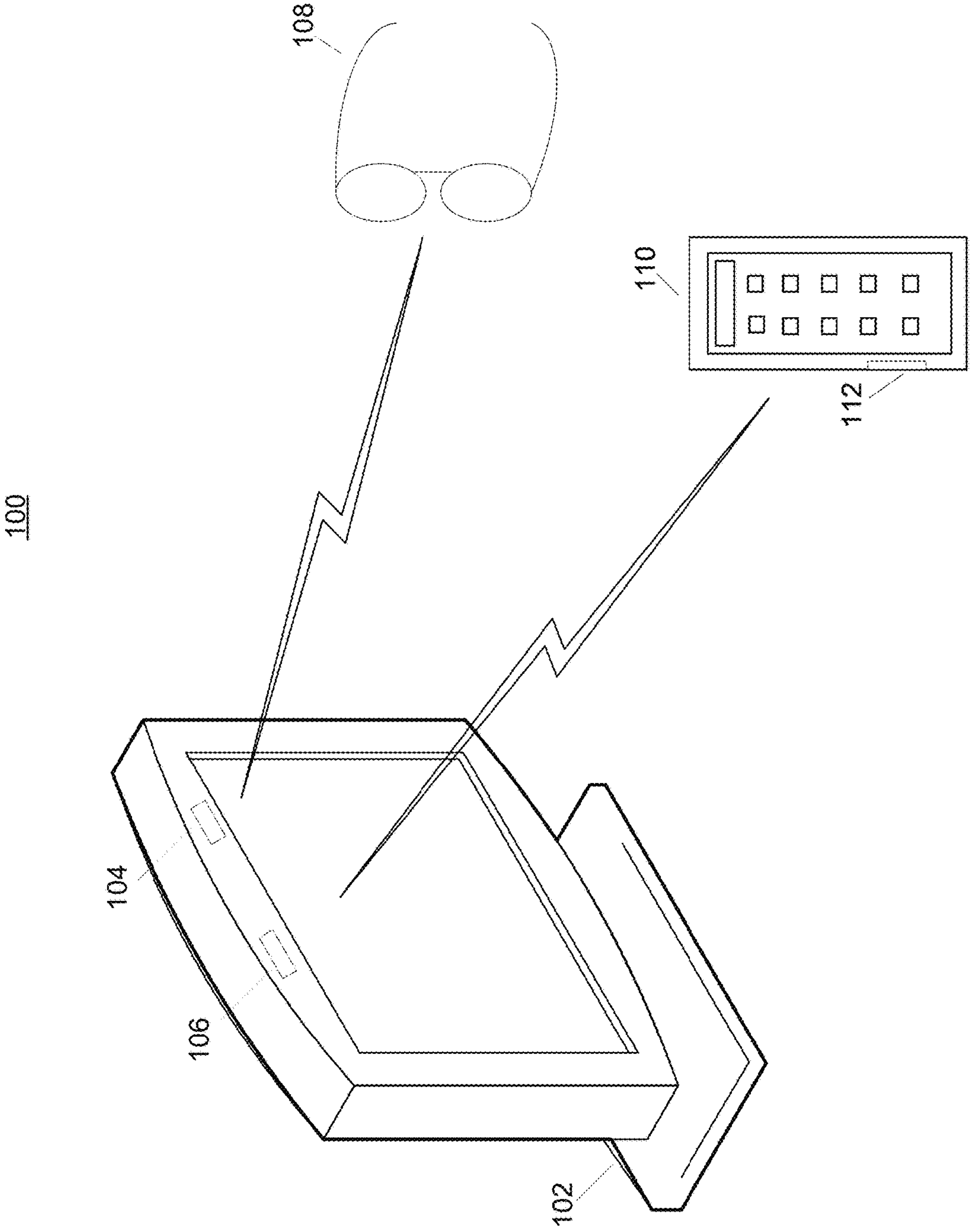
FIG. 1 illustrates a functional block diagram of a system for reducing interference between a 3D display device, a 3D viewing device, and a remote control in accordance with an aspect of the disclosure.

FIG. 1 illustrates a functional block diagram of a system for reducing interference (e.g., infrared interference) between a display device, such as a 3D television, a 3D viewing device, such as headgear or eyeglasses, and a remote control for the display device and/or other device. The system 100 may include a 3D display device 102 (or any other display device such as a television or mobile device) having a transmitter 104 (e.g., IR transmitter) and a receiver 106 (e.g., an IR receiver), a pair of 3D eyeglasses 108 (or another type of 3D viewing device), and a remote control 110. The 3D display device 102 may be any display device or associated content rendering device. The 3D glasses 108 may be any viewing device or another device receiving transmissions from the display device 102. Although embodiments may be described using infrared technology, the disclosure is applicable to other signaling technologies. When presenting a video in 3D, the 3D display device 102 may display a video signal that is a composite of two image sequences: a left eye image sequence and a right eye image sequence. The 3D display device 102 may alternate between displaying an image from the left eye image sequence and an image from the right eye image sequence at a particular frame rate.

The 3D display device 102 may cause the infrared transmitter 104 to communicate an infrared (IR) signal pulse at the frame rate to inform the 3D viewing device 108 of the frame rate. The transmitter may, for example, transmit in multiple directions (e.g., just towards glasses 108, and/or in other directions). The infrared transmitter 104 may also be referred to as an infrared blaster. The glasses 108 may have a clock and may synchronize the clock to the frame rate. Based on the clock, the glasses 108 may control shuttering of the left and right lens. When the glasses 108 are worn by a viewer, the left lens may cover the viewer's left eye and the right lens may cover the viewer's right eye. The two lenses may have unobstructed and obstructed states. When viewing 3D video, the glasses 108 may cause one of the lenses to be in the unobstructed state and the other to be in the obstructed state, and then alternate which lens is obstructed at the frame rate.

The shuttering may have a 50% duty cycle, where a left lens is unobstructed for 50% of the time and a right lens is unobstructed for the remainder of the 50% of the time. The shuttering may occur multiple times per second, thereby permitting a left eye of the viewer to only see the left eye image sequence, and the right eye to only see the right eye image sequence. The IR transmitter 104, however, may interfere with other devices that use infrared transmission, such as the remote control 110. Or, if transmitter 104 uses different types of signals, it may interfere with other devices that may be affected by such a signal.

Referring again to FIG. 1, the interference between transmissions by the transmitter 104 and the remote control 110 may be reduced, in accordance with example embodiments described below. For a first option, the remote control 110 may detect a timing of signal pulses emitted by the transmitter 104, and transmit only in the gaps between the signal pulses. In a second option, the 3D display device 102 may inform the remote control 110 of time periods to transmit between transmission of signal pulses by the transmitter 104. In a third option, the transmitter 104 may be an array of transmitters and the 3D display device 102 may control the directionality of the array so that signal pulses are only sent in the direction of the glasses 108, and not in other directions. In a fourth option, the 3D display device 102 may have a pulse rate that is modifiable in response to a signal from the remote control 110. Each of these and other options is discussed below in further detail.

Referring to the first option for reducing interference (e.g., infrared interference), the remote control 110 may include a sensor 112 (e.g., an IR sensor) to detect a timing of signal pulses (e.g., IR pulses) sent by the transmitter 104. The remote control 110 may detect a frequency of the signal pulses, and transmit in a time interval between each signal pulse. For example, the sensor 112 of the remote control 110 may detect that IR pulses are transmitted from the display device's transmitter 104 twelve times per second, and may transmit in a time interval between each pulse. The remote control 110 may also determine a guard band, which may be a certain time interval before and after each signal pulse, and may avoid transmitting during the guard band as well.

Figure 2:
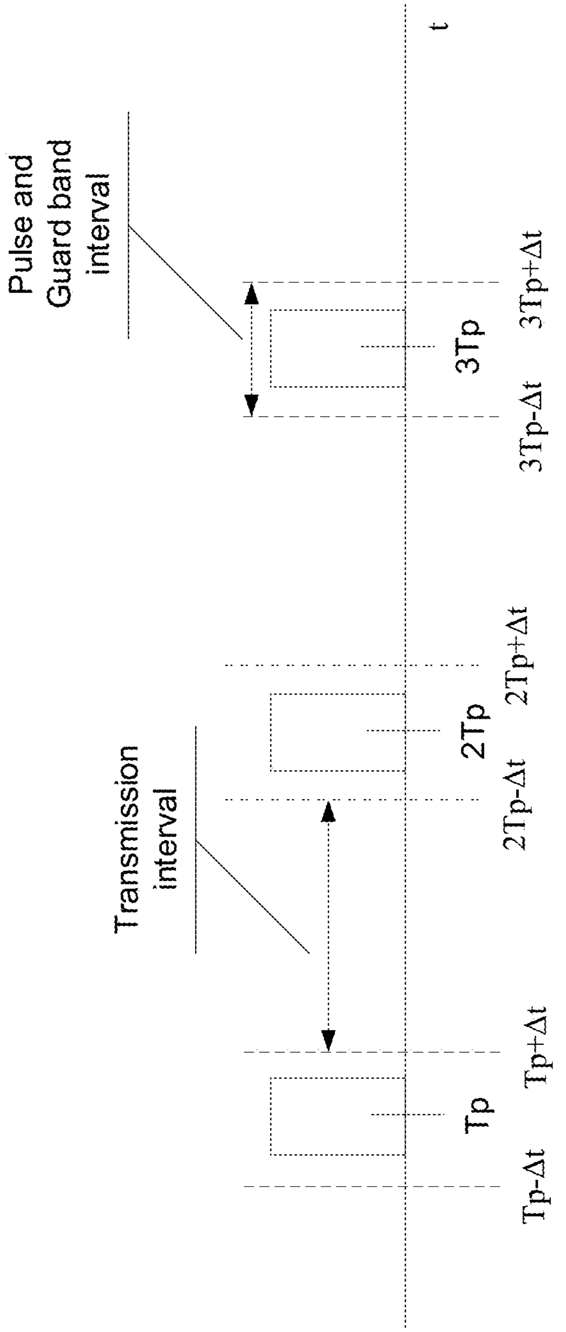
FIG. 2 illustrates an example timing diagram for infrared (IR) pulses and guard bands in accordance with an aspect of the disclosure.

FIG. 2 illustrates an example timing diagram for signal pulses and guard bands. The display device's transmitter 104 may transmit the signal pulses at intervals of Tp seconds apart. The guard band may be a time interval occurring before and/or after the each of the signal pulses. Each guard band may be an independent time interval situated on either side of each signal pulse. The remote control 110 may avoid transmitting during each pulse and guard band interval (e.g., the time period between $Tp-\Delta t$ and $Tp+\Delta t$ for the first IR pulse), and instead transmit during a transmission interval which is a period of time occurring between the end of one guard band (or signal pulse if guard bands are not used) and a beginning of the next guard band (e.g., the time interval between $Tp+\Delta t$ and $2Tp-\Delta t$ between the first and second pulses).

When a user provides input selecting a command (e.g., actuating a button on a remote control 110 or selecting of an icon from a graphical user interface displayed on the remote control 110), the remote control 110 may determine (e.g., via an internal processor) whether a signal pulse and/or guard band is ongoing. If ongoing, the remote control 110 may buffer the selected command until the end of the guard band and/or signal pulse, and then transmit a command packet based on the selected command during the transmission interval. If not ongoing, the remote control 110 may determine whether the entire command packet may be sent before the beginning of a next guard band and/or of a next signal pulse. If sufficient time exists, the remote control 110 may send the command packet via IR or another signaling method.

If not, the remote control 110 may determine whether the command packet can be fragmented and a fragment of the command packet can be sent before the beginning of a next guard band and/or next signaling pulse. For example, if a transmission interval has a duration of ten units of time (e.g., milliseconds), there are four units of time before the start of the guard band, and a command requires eight units of time to send, the remote control 110 may fragment the command and send a first fragment over the four units of time before the start of the guard band and send a second fragment over a first four units of time of a subsequent transmission interval. If there is not enough time to generate the fragment, the remote control 110 may buffer the command packet until the end of the guard band and/or signaling pulse and send during a subsequent transmission interval. Also, if the command packet takes longer to transmit than the entire transmission interval, the remote control 110 may fragment a payload of the command packet into multiple smaller commands to permit transmission.

Figure 3:
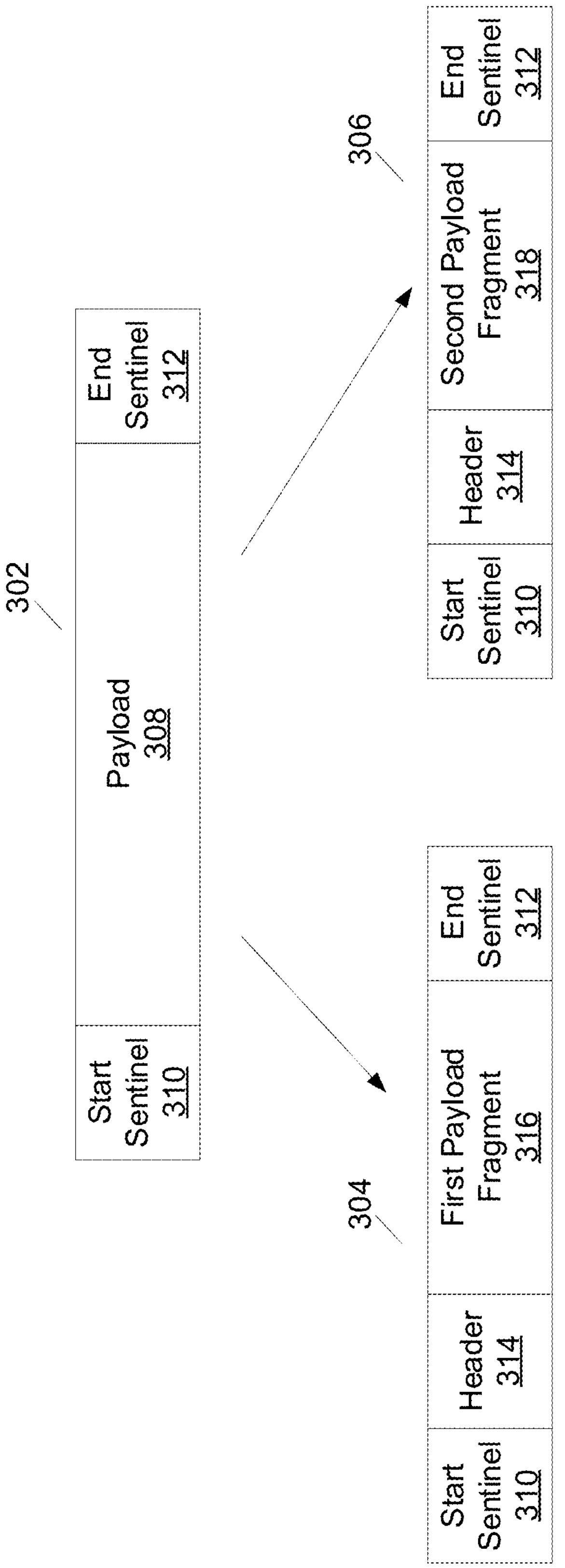
FIG. 3 illustrates an example of fragmenting a command packet in accordance with an aspect of the disclosure.

FIG. 3 illustrates an example of fragmenting a command packet. The command packet 302 may be a bit sequence instructing the 3D display device 102 to perform an operation. The command packet 302 may include a payload 308, a start sentinel 310, and an end sentinel 312. The payload 308 may include a data sequence for an instruction to cause the 3D display device 102 to perform any type of operation. The operation may be to change a channel or volume level, display a program guide, etc. The start sentinel 310 may be a data sequence informing the 3D display device 102 of the beginning of the command packet 302. The end sentinel 312 may be a data sequence informing the 3D display device 102 of the end of the command packet 302.

FIG. 3 illustrates an example where packet 302 is fragmented into two payload fragments: first payload fragment 316 and second payload fragment 318. Initially, the remote control 110 may divide the payload 308 into two or more payload fragments. For each payload fragment, the remote control 110 may add a start sentinel 310, a header 314 and an end sentinel 312 to create a command fragment packet. The header 314 may include sequencing information for the payload fragments so that the 3D display device 102 may reconstruct the payload 308 of the command packet 302 from the command fragment packets 304 and 306 upon receipt. For example, the 3D display device 102 may process a group of packets received from the remote control 110, determine that each of the packets contains a fragment of a command, and reconstruct the command from the fragments.

Also, the remote control 110 and/or the 3D display device 102 may concatenate data of commands being sent to one another to reduce the amount of exchanged data. In an example, digital data being encoded such that a '1' occurs during an interval when a signal pulse is transmitted and '0' occurs during an interval when no pulse is being sent. For a first message of '1001' and a second message of '011011001,' the last two bits of the first message are the same as the first two bits of the second message (i.e., 01). Rather than sending '01' twice, the remote control 110 (and/or the 3D display device 102) may remove the second instance of '01' and concatenate the two messages resulting in a combined message of '10011011001' (i.e., '1001' and '011011001'—initial '01' becomes '10011011001'). Hence, the combined message uses two less bits than sending the first and second messages separately. Combining messages may require that the bits of each message are sent at the same rate, and may require precise timing on the transmit side and more advanced decoding on the receiving side.

In another aspect of the disclosure, referring again to FIG. 1, a second option to reduce interference is to have the 3D display device 102 inform the remote control 110 when to transmit its signals in order to avoid interfering with the signal pulses of the transmitter 104. For example, the 3D display device 102 may begin transmitting signal pulses at a rate corresponding to a frame rate of a video program. To inform the remote control 110 of the rate, the 3D display device 102 may generate a pulse time message specifying the pulse rate and a time duration of the transmission interval between one or each consecutive pair of the signal pulses (e.g., 50 milliseconds). The 3D display device may then cause the transmitter 104 to transmit the pulse time message to the remote control 110. The pulse time message may also specify a time duration of each pulse and/or of each guard band, and whether a guard band precedes each of the pulses and/or follows each of the pulses. The remote control 110 may transmit, as discussed above, during the transmission intervals between the pulses and/or guard bands.

In another aspect of the disclosure, a third option to reduce interference is to implement the transmitter 104 as an array of directional transmitters that are spatially offset from one another arranged to transmit in different directions. Two or more transmitters of the array also may also be arranged to transmit in a same direction. The 3D display device 102 may cause only a subset of the array to transmit the signal pulse (e.g., IR pulse) so that signals (e.g., IR signals) are only sent in the direction of the viewing device 108. The 3D display device 102 may turn off the remaining transmitters in the array that are not included in the subset. Line of sight infrared transmissions exchanged between the 3D display device 102 and the viewing device 108 may be used to determine the position of the 3D display device 102 relative to the viewing device 108, an example of which is described below with reference to FIG. 4.

Figure 4:
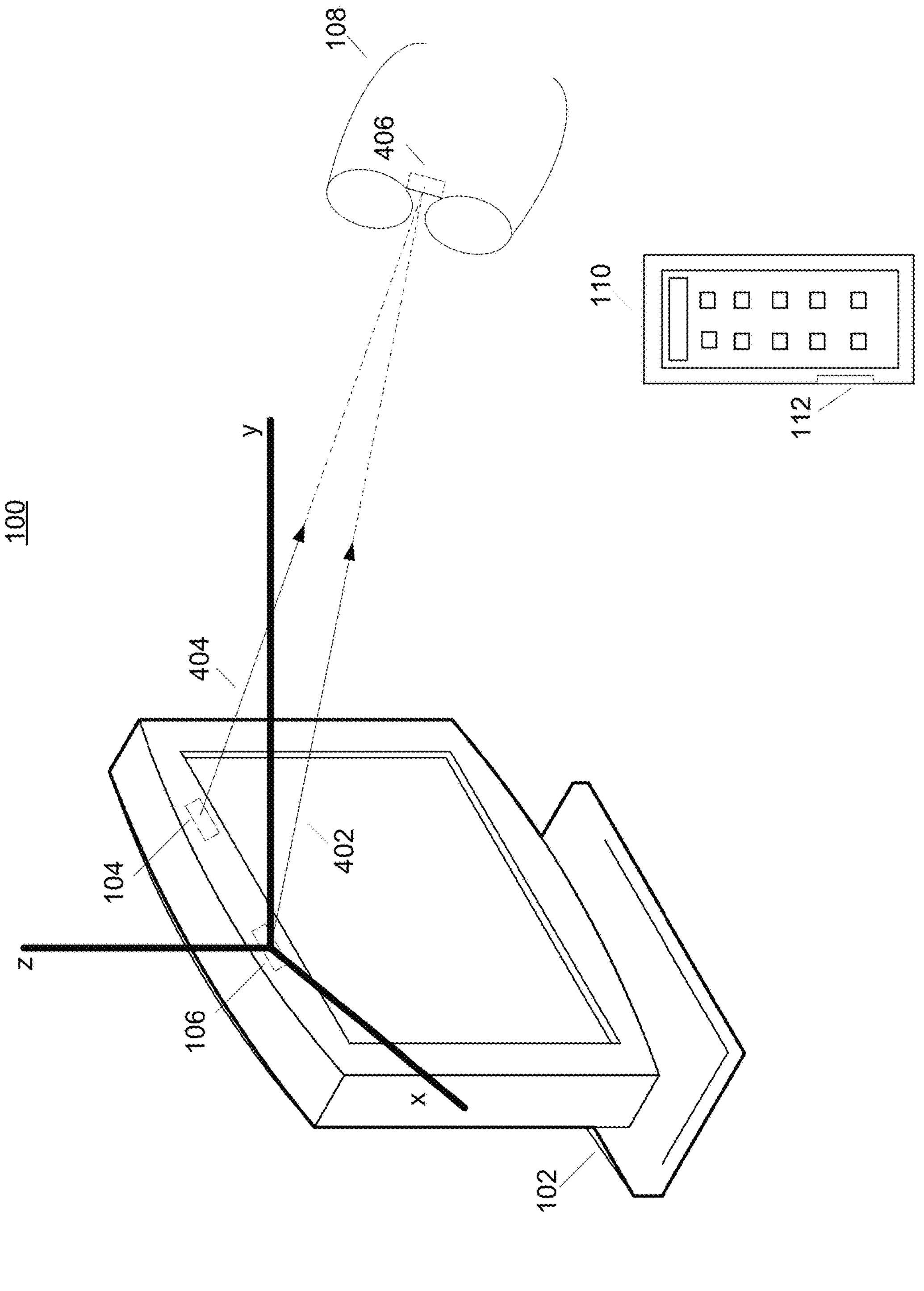
FIG. 4 illustrates an example of determining a position of a 3D display device relative to glasses in accordance with an aspect of the disclosure.

In an example, the glasses 108 may include an IR transmitter 406 (and/or another signal-type transmitter) located on the bridge or other location that would be in a light of sight of the 3D display device 102 when worn by a user to view 3D video displayed by the 3D display device 102. The 3D display device 102 may define a coordinate system relative to the IR receiver 106 to detect a direction and/or position of the IR signal received from the transmitter 406. For instance, the 3D display device 102 may define x, y, and z coordinates in a Cartesian system. The IR receiver 106 may determine an angle of arrival of an IR signal received from the IR transmitter 406. The 3D display device 102 may determine a direction/position 402 of the glasses 108 relative to the 3D display device 102 based on the angle of arrival. The 3D display device 102 may also have a stereoscopic 3D camera to detect 3D motion to determine the direction/position 402 of the glasses 108 relative to the 3D display device 102. Also, the IR receiver 106 and the IR transmitter 104 may be offset from one another, as shown in FIG. 4, and hence the IR transmitter 104 may transmit in a direction 404 that differs from the direction 402. The 3D display device 102 may determine the direction 404 based on the direction of 402 using geometry and/or known relative locations of 104 and 106.

Upon detecting the direction 402 (or direction 404), the 3D display device 102 may identify a subset of the transmitters 104 of the array that are arranged to transmit in the direction 402 (or direction 404). The following describes transmission in the direction 402, but the 3D display device 102 may also transmit in the direction 404 if the transmitters 104 are offset from the receiver 106. The transmission direction of the array may be somewhat askew compared to the direction 402.

Below is an example of selecting a subset of the transmitters 104 from the array for transmission of the IR pulses. Other methods for selecting the subset may also be used. In an example, the 3D display device 102 may use two metrics to select a subset of the transmitters to include in the array. The 3D display device 102 may use the first metric alone or a combination of the first and second metrics (e.g., use all of the transmitters identified by either metric) to select the transmitters to include in the subset For the first metric, the 3D display device 102 may select only the transmitters 104 from the array for transmitting signal pulses that are situated to transmit in a direction that is within a certain degree of difference relative to the direction 402 (e.g., any transmitter situated to transmit within 15 degrees of the direction 402). The 3D display device 102 may turn off the remaining transmitters 104 in the array not included in the subset.

In selecting the transmitters 104, the 3D display device 102 may compare the direction in which of the transmitters 104 are situated to transmit relative to the direction 402. Based on the comparison, the 3D display device 102 may determine which transmitters 104 transmit in a direction that is within the degree of difference relative to the direction 402. The 3D display device 102 may also list the transmitters 104 of the array based on those having a smallest angle difference to a largest angle difference relative to direction 402.

The degree of difference may have a default value (e.g., within 25 degrees of the direction 402) that may be adjusted based on, for example, a distance between the 3D display device 102 and the glasses 108 as well as on movement of the user wearing the glasses 108. For instance, the 3D display device 102 may calculate how long it takes to turn on a transmitter versus an average movement speed of a human to adjust the degree of difference. This calculation may account for a distance of the user from the 3D display device 102, which may reduce the default value for the degree of difference when the user is farther from the 3D display device 102, and increase the default value when the user is closer.

When closer to the 3D display device 102, the user may move across infrared arcs more quickly than when farther away. When there is a larger degree of difference, the 3D display device 102 may include a larger number of transmitters 104 in the subset, which may reduce the likelihood that there is a loss of communication with the glasses 108 caused by quick movement of the user. Also, the 3D display device 102 may include a larger number of transmitters in the subset to reduce the possibility that the 3D display device 102 is unable to turn on an additional transmitter from the array not included in the subset before the user is out of range.

When farther away, the 3D display device 102 may have more time to turn on an additional transmitter as it takes longer for a user to move out of range of a particular transmitter and/or of the transmitter subset. Using fewer transmitters in the subset may reduce the amount of IR interference that would otherwise be caused by IR transmitters transmitting in directions away from the user.

For the second metric, the 3D display device 102 may also include a predetermined number of transmitters in the subset that are adjacent to the ones identified in the first metric. The second metric also may specify a minimum number of transmitters to include in the subset. For example, if the degree of difference relative to the direction 402 determined in the first metric is 15 degrees and the IR transmitters cover 20 degrees, the 3D display device 102 may use the first metric to select a first transmitter transmitting in a direction having a smallest degree of difference when compared to the direction 402. Using the second metric, the 3D display device 102 may select a second transmitter having a next smallest difference and that is adjacent to the first transmitter in the array. The 3D display device 102 may include both the first transmitter and the second transmitter in the subset for transmitting IR pulses, and may turn off the remaining transmitters of the array.

The 3D display device 102 may periodically receive signals from the transmitter 406 to monitor changes to the direction/position of the glasses 108 relative to the 3D display device 102. The 3D display device 102 may then update which of the subset of the IR transmitters in the array may transmit based on the changed direction. The 3D display device 102 may thus primarily transmit the IR pulses in the direction of the glasses 108, but not in other directions, thereby limiting an amount of infrared radiation for interference with the remote control 110.

Along with IR transmitters facing different directions, the array may include IR transmitters having different intensities. The 3D display device 102 may use IR transmitters having the least output power that have satisfactory performance. For example, the glasses 108 may communicate an IR pulse or RF transmission to the 3D display device 102 requesting an adjustment to the intensity. Initially, the glasses 108 may make a measurement of a signal to noise (SNR) ratio. If the SNR ratio is above a first threshold, the glasses 108 may request that the 3D display device 102 decrease the intensity. If the SNR ratio is below a second threshold that is lower than the first threshold, the glasses 108 may request that the 3D display device 102 increase the intensity. In response to these requests, the 3D display device 102 may gradually reduce or increase the intensity by fixed or variable amounts until one or more sets of the glasses 108 requests an increase or decrease in signal power. Also, the glasses 108 may also request a predetermined increase or decrease in transmitter power. The predetermined increase or decrease may be based on the SNR ratio.

A fourth option to reduce infrared interference is for the 3D display device 102 to modify a rate of pulse transmission by the display device's transmitter 104 in response to receiving a rate change request from the remote control 110. Typically, the frame rate of a 3D program may remain constant over a duration of a program. Once the glasses 108 have synchronized its clock to the frame rate, the glasses 108 may maintain shuttering of the lens at the frame rate even if one or more signal pulses from the IR transmitter 104 are not detected when expected. After the glasses 108 have been initially synchronized, the 3D display device 102 may vary (e.g., reduce) the rate of the signal pulses transmitted by the transmitter 104. For example, the 3D display device 102 may reduce an IR pulse rate of the IR transmitter 104 by half, a quarter, an eighth, etc.

The remote control 110 may use the reduced signal pulse rate to increase the amount of command packets sent to the 3D display device 102. A reduced signal pulse rate may be beneficial, for example, when the remote control 110 has to send a large number of command packets (e.g., users presses and holds a channel up or volume up key causing the remote control 110 to enter a turbo mode) during a relatively short period of time to provide a satisfactory user experience. Because there are fewer signal pulses and optionally corresponding guard bands, the remote control 110 may send a higher rate of command packets as there may be a longer time period between each signal pulse. The remote control 110 may also fragment fewer of the commands due to the longer time periods, thus reducing the amount of overhead (e.g., header 314 and end sentinel 312) due to avoiding fragmenting of the command packets.

In response to a key press, the remote control 110 may determine whether to send a rate change request command to the 3D display device 102. The remote control 110 may buffer unsent commands and compare a total data size of the buffered commands to a threshold. If the total data size exceeds the threshold, the remote control 110 may send the rate change request to the 3D display device 102 to reduce the rate of signal pulse transmissions by the transmitter 104. The rate change request may also specify the rate reduction. Additionally, the 3D display device 102 may sense that a certain percent of available remote control transmit times are being used (e.g., 85%), and, in response, may automatically reduce the signal pulse rate.

The 3D display device 102 may then cause the transmitter 104 to send a signal pulse including a rate reduction message to inform the glasses 108 of the rate reduction. Even though fewer pulses are transmitted, the glasses 108 may continue to use the received signal pulses to maintain clock synchronization to the frame rate. For example, if the reduced signal pulse rate is a quarter of the frame rate, the glasses 108 may maintain clock synchronicity such that every fourth shuttering of the lenses shutter corresponds to when a signal pulse is received. The 3D display device 102 optionally may cause the transmitter 104 to communicate a message to the remote control 110 confirming the rate reduction, adjusting the rate reduction, or denying the rate change request. In another example, the 3D display device 102 may automatically reduce the signal pulse rate upon receipt of the rate change request.

In response to receiving a rate reduction confirmation message or if the rate reduction occurs automatically without acknowledgement by the 3D display device 102, the remote control 110 may begin transmitting during the increased duration of the transmission interval between the signal pulses. When the buffer of the remote control 110 is empty (or when the total data size is reduced a predetermined amount below the threshold), the remote control 110 may transmit a resume pulse rate command to the 3D display device 102 to increase the rate of the signal pulses to the frame rate. Also, the 3D display device 102 may automatically increase the rate of the signal pulses to the frame rate in response to not receiving command packets from the remote control 110 within a predetermined amount of time or when less than a certain percentage of available remote control transmit times are being used. The 3D display device 102 may then inform the glasses 108 of resuming transmission of the signal pulses corresponding to the frame rate. The system 100 therefore may reduce transmission interference.

In another example, the glasses 108 may include an RF transceiver for communicating with the 3D display device 102 instead of communicating via IR. To avoid RF interference, the glasses 108 may communicate with the 3D display device 102 to determine synchronization data used for communication between the 3D display device 102 and the remote control 110 or other RF devices (e.g., WiFi).

Another manner of eliminating infrared interference is to avoid infrared transmission altogether. Some remote controls may use alternative transmissions schemes, such as, for example, RF instead of IR, for communication with a television. Infrared transmission, however, is the predominant transmission means and most RF-enabled remote controls may transmit using both IR and RF. Conventionally, a user is manually required to key in data to cause a remote to transition from transmitting in IR to RF. This may be a cumbersome process for some users.

To reduce the burden on the user, the system 100 may provide for automatic transition between IR and RF modes of the remote control 110. In an example, the remote control 110 may be configured to communicate with the 3D display device 102 using either infrared or radio frequency transmissions, or other signaling mediums. The below discussion refers to the 3D display device, but is applicable to non-3D display devices or set top boxes coupled to a television. In an example, the 3D display device 102 may communicate using one of three modes: (1) IR only; (2) IR and RF; and (3) RF only.

If the 3D display device 102 is enabled to communicate using IR but not RF, then the 3D display device 102 may receive command packets from the remote control 110 in response to button presses as with a conventional IR-only remote control.

Figure 5:
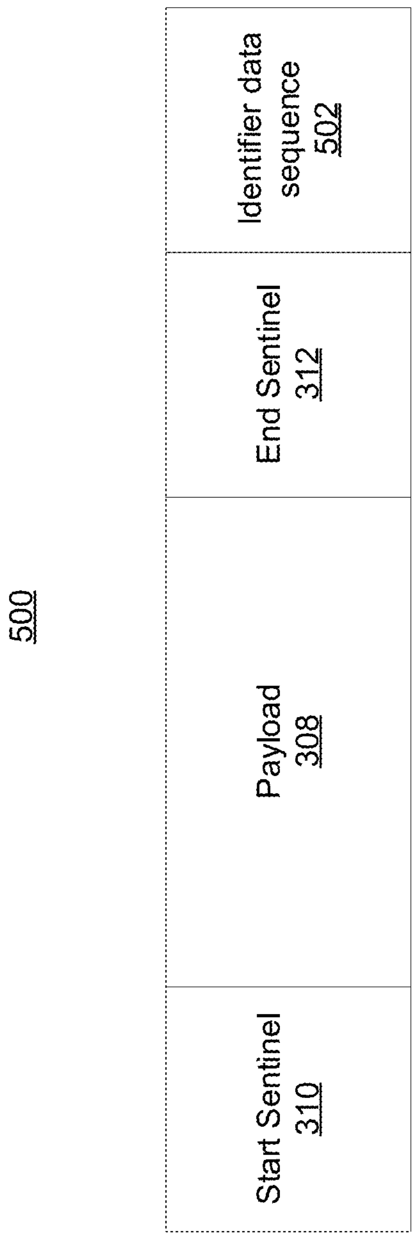
FIG. 5 illustrates an example command packet including an identifier data sequence in accordance with an aspect of the disclosure.

If the 3D display device 102 is configured to communicate using both IR and RF modes, then the 3D display device 102 may automatically cause the remote control 110 to transition from using IR transmissions to RF transmissions, provided that the remote control 110 is RF-enabled. To inform the 3D display device 102 of RF transmission capability, the remote control 110 may add an identifier data sequence 502 (e.g., byte) at the end of at least one of the command packets sent to the 3D display device 102, as depicted in FIG. 5. The identifier data sequence 502 may indicate that the remote control 110 supports communication using an alternative signaling frequency (e.g., RF) and may include remote control (RC) address data (e.g., a media access control [MAC] address) of the remote control 110. By placing the identifier data sequence 502 at the end, legacy televisions that only use IR transmissions may also process the command packet 500. Legacy televisions may ignore the portion of the command packet 500 occurring after the end sentinel 312 (e.g., the identifier data sequence 502) because it is not preceded by a start sentinel 310.

Upon receiving the command packet 500, the 3D display device 102 may identify the identifier data sequence 502 at the end. The 3D display device 102 may respond by communicating a pairing request via RF transmission. The pairing request may include the RC address data of the remote control and display device address data (e.g., MAC address) of the 3D display device 102. Including the RC address may inform the remote control 110 that the pairing request is intended for the remote control 110, and not some other device.

The remote control 110 may respond to the pairing request by communicating a pairing response message via IR transmission. IR transmission may be used to confirm line of sight between the remote control 110 and the 3D display device 102. Requiring line of sight may be a further type of authentication mechanism to prevent distant devices from gaining control of the 3D display device 102. The remote control 110 may also send the pairing response message via RF transmission. For further authentication, the 3D display device 102 may display information for a user to key into the remote control 110 prior to the remote control 110 sending the pairing response message to confirm that a user desires the pairing.

Once the display device and remote control address data has been exchanged, the remote control 110 and the 3D display device 102 may exchange keys to permit encryption of messages sent between them and to establish a communication session using the alternative signaling frequency (e.g., using RF). Thereafter, the remote control 110 and the 3D display device 102 may cease communicating in IR and may only transmit in RF using the communication session.

The remote control 110 may still use IR, if desired even after pairing, but may no longer include the identifier data sequence 502 in the command packet 500. If the remote control 110 continues to transmit in IR, the 3D display device 102 may respond with an acknowledgment message using RF after each command packet is received or after a predetermined number of command packets have been received (e.g., acknowledge every $2^{nd}$, $3^{rd}$, etc. command packet). The 3D display device 102 may also respond in IR based on a percent of available transmit time on the IR channel (e.g., 15% or more of time is not being used). The 3D display device 102 may also acknowledge a received command packet at predetermined time intervals (e.g., during a 5 second interval that occurs every minute) to limit the length of time the remote control 110 listens for acknowledgement message, thus saving battery power.

In another example, the 3D display device 102, rather than the remote control 110, may initiate the pairing to establish a communication session for RF transmissions. In this example, the remote control 110 may transmit the command packet 500 without the identifier data sequence 502. Upon detecting the command packet 500, the 3D display device 102 may transmit a pairing request including the display device address data (e.g., MAC address) of the 3D display device 102 via RF transmission. If a pairing response message is not received from the remote control 110, the 3D display device 102 may communicate the pairing request a predetermined number of times in response each command packet 500 or a predetermined number of command packets, for a predetermined amount of time (e.g., during 5 minute time interval after receipt of a first command packet) or periodically (e.g., every 10 seconds for the first minute, and every minute thereafter, etc.). If the remote control 110 does not respond, the 3D display device 102 may assume that the remote control 110 does not have RF transmission capabilities.

If the pairing request is received, the remote control 110 may respond by communicating a pairing response message via IR transmission, as discussed above, that also includes the remote control address data. Line of sight and entry of information into the remote control 110 by the user, as discussed above, may also be used. Once the display device and remove control address data has been exchanged, the remote control 110 and the 3D display device 102 may exchange keys to permit encryption of messages sent between them and establish a communication session for RF transmissions.

In another example, the remote control 110 may initiate pairing by sending out an RF discovery request to initiate pairing with a television that communicates using RF, but not IR, transmissions. The remote control 110 may send the RF discovery request in response to a user pressing a particular button, periodically, with every button press, every predetermined number of button presses, or when initially supplied with a power source (e.g., when a battery is first inserted). The 3D display device 102 may respond with a pairing response message to initiate establishing a communication session for RF transmissions, as discussed above.

In a further example, the user may cause the 3D display device 102 that communicates using RF, but not IR, to initiate pairing to establish a communication session for RF transmissions. This example may save battery power of the remote control 110 by not requiring periodic transmission of an RF discovery request when an RF enabled television may not be within range. When the 3D display device 102 is first powered on and is not yet paired with a remote control 110, the 3D display device 102 may display instructions on screen for pairing with a remote control 110. Remote control pairing instructions may also be printed on a back of the remote control 110 and included in the remote control manual. The user, for example, may key in a data sequence displayed by the 3D display device 102 into the remote control 110. The remote control 110 may transmit a pairing request including the data sequence and the RC address data to the 3D display device 102. The 3D display device 102 may respond with a pairing response message including display device address data, and the 3D display device 102 and the remote control 110 may establish a communication session for RF transmissions, as described above.

In a further example, the remote control 110 may broadcast an unpaired message via RF to signal to all RF-enabled 3D displays 102 that a RF remote is in range, but is not paired yet. The unpaired message may be sent on multiple RF frequencies commonly used for communicating with RF-enabled televisions. The unpaired message may be an unacknowledged broadcast message, thus saving power as the remote control does not listen for a response. The remote control 110 may send the unpaired message when the user presses a button to send a command via RF to an RF-enabled 3D display device 102.

One or more 3D displays 102 that receive the unpaired message may react by displaying pairing instructions. The user, for example, may key in a data sequence displayed by the 3D display device 102 into the remote control 110. The remote control 110 may transmit a pairing request including the data sequence and the RC address data to the 3D display device 102. The 3D display device 102 may respond with a pairing response message including the display device address data, and the 3D display device 102 and the remote control 110 may establish a communication session for RF transmissions, as described above.

Any of the above-mentioned functional blocks, including the 3D display device 102, glasses 108, and remote control 110, may each be implemented with a processor and memory. The functional blocks may include hardware that may execute software and/or be configured in hardware to perform specific functions. The software may be stored on a non-transitory computer-readable medium or a memory in the form of computer-readable instructions. A computer may read those computer-readable instructions, and in response perform various steps as defined by those computer-readable instructions. Thus, any functions attributed to any of the functional blocks in the figures as described herein may be implemented, for example, by reading and executing such computer-readable instructions for performing those functions, and/or by any hardware subsystem (e.g., a processor) from which the computer is composed.

The term "computer-readable medium" as used herein includes not only a single physical medium or single type of medium, but also a combination of one or more physical media and/or types of media. Examples of a computer-readable medium include, but are not limited to, one or more memories, hard drives, optical discs (such as CDs or DVDs), magnetic discs, and magnetic tape drives. Such a computer-readable medium may store computer-readable instructions (e.g., software) and/or computer-readable data (i.e., information that may or may not be executable). In the present example, a computer-readable medium (such as memory) may be included in any one or more of the functional blocks shown in the figures and may store computer-executable instructions and/or data used by any of those functional blocks. Alternatively or additionally, such a computer-readable medium storing the data and/or software may be physically separate from, yet accessible by, any of the functional blocks shown in the figures.

Figure 6:
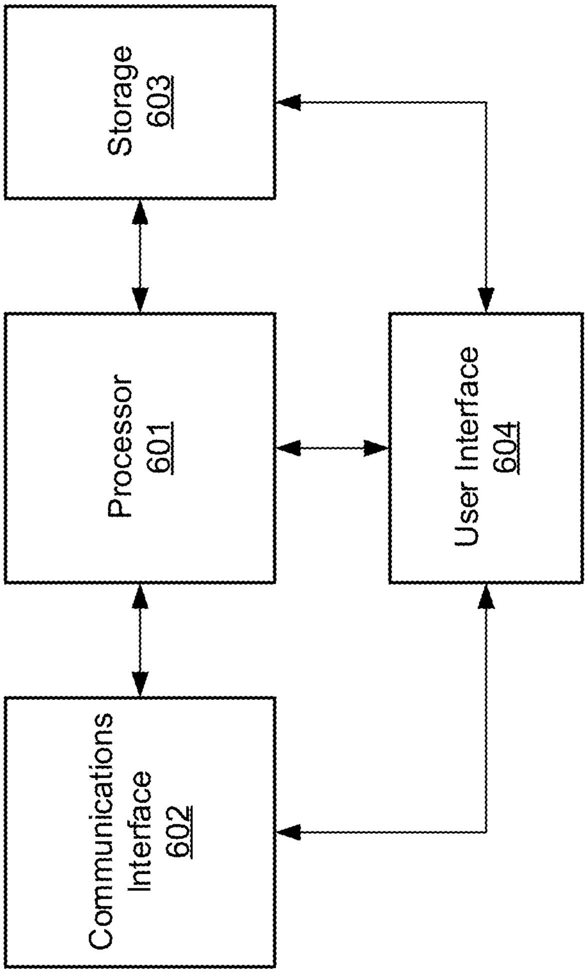
FIG. 6 illustrates example functional blocks in accordance with an aspect of the disclosure.

An example functional block diagram is shown in FIG. 6 and may include processor 601, a communications interface 602, storage 603, and a user interface 604. In this example, the computer-readable medium may be embodied by storage 603, and processor 601 may execute computer-executable instructions stored by storage 603. Communications interface 602 may provide for unidirectional or bidirectional communications with any network or device external to that computer. For example, communications interface 602 as embodied in the 3D display device 102 may provide communications between the 3D display device 102 and the glasses 108. User interface 604 may allow for unidirectional or bidirectional information transfer with a human user using, for example, a display or a keyboard. Again, any of the functional blocks of the figures may be implemented using the components shown in FIG. 6.

FIGS. 7-10 illustrate flow diagrams for implementing some or all of the methods discussed above. While discussed in terms of infrared (IR), these methods are applicable to transmission using any signaling techniques that may experience interference.

Figure 7:
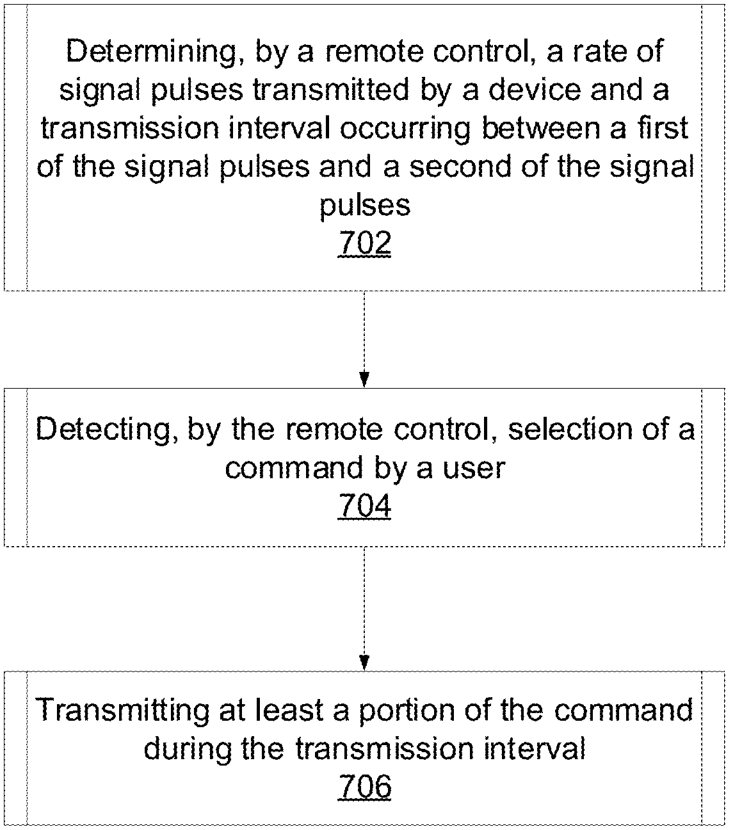
FIG. 7 illustrates an example flow diagram of a method for transmitting during a transmission interval between transmissions of first and second signal pulses in accordance with an aspect of the disclosure.

Referring to FIG. 7, this figure illustrates an example flow diagram of a method for transmitting during a transmission interval between first and second signal pulses. The method may be implemented by the remote control 110 and may begin at block 702. In block 702, the method may include determining, by a remote control, a rate of signal pulses transmitted by a device and a transmission interval occurring between a first of the signal pulses and a second of the signal pulses. For example, the remote control 110 may receive a signal from the 3D display device 102 specifying the rate of infrared pulses. In another example, the remote control 110 may detect a frequency of receipt of the signal pulses transmitted by the 3D display device 102 and may determine the rate of the signal pulses based on the frequency. The remote control 110 may also determine whether a guard band is positioned on either side of each pulse. In block 704, the method may include detecting, by the remote control, selection of a command by a user (e.g., a user's input to change volume).

In block 706, the method may include transmitting at least a portion of the command during the transmission interval. In an example, the remote control 110 may determine whether the entire command may be transmitted during the transmission interval. If so, the remote control 110 may cause transmission (e.g., IR transmission) of the command in a command packet. If the remote control 110 determines that a time interval required to transmit the command packet exceeds the transmission interval, the remote control 110 may fragment the command in at least two command fragments. The remote control 110 may generate at least two command fragment packets and may cause infrared transmission of a first of the command fragment packets during the transmission interval, and cause transmission of a second of the command fragment packets during a subsequent transmission interval. The command fragment packets may each include a header that provides sequencing information for a first of the command fragments relative to a second of the command fragments to permit reconstruction of the command upon receipt. The method may then end or return to block 702 or 704.

Figure 8:
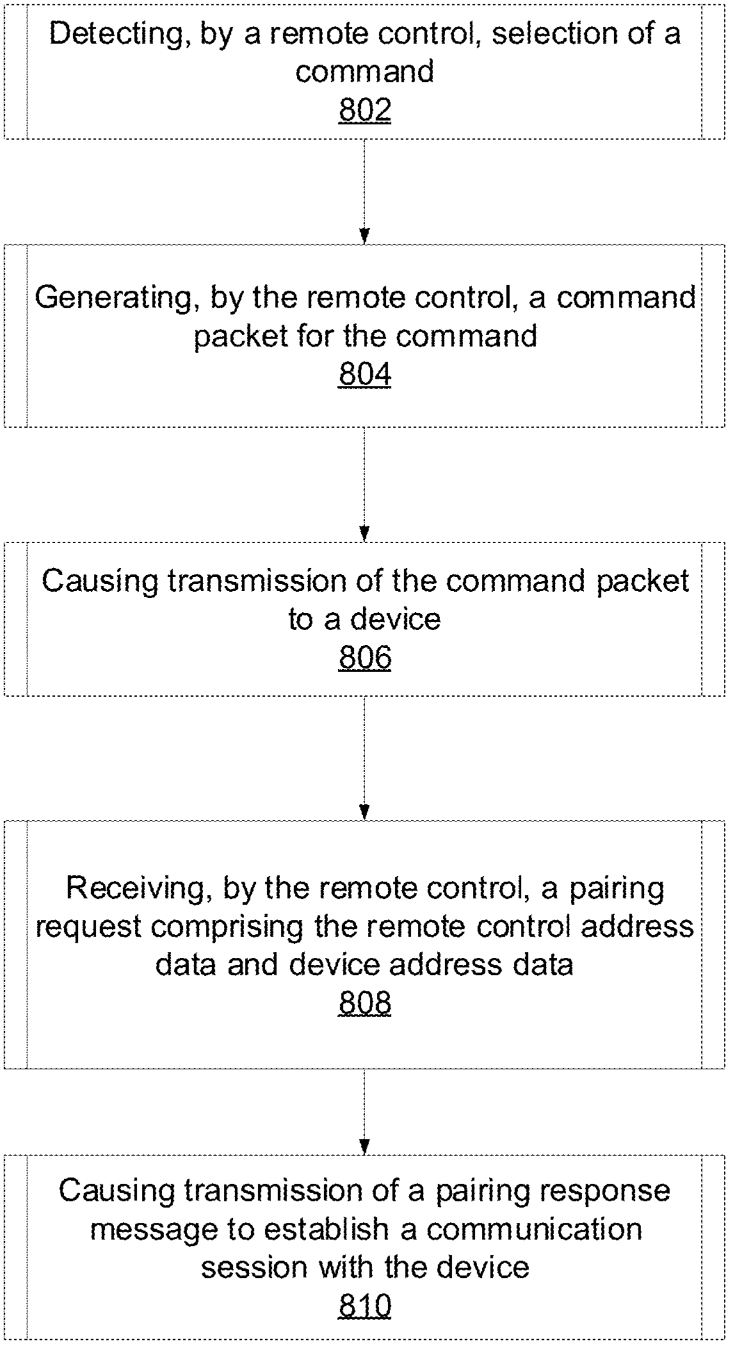
FIG. 8 illustrates an example flow diagram of a method for establishing a communication session with a device in accordance with an aspect of the disclosure.

Referring to FIG. 8, this figure illustrates an example flow diagram of a method for establishing a communication session with a device. The method may be implemented by the remote control 110 and may begin at block 802. In block 802, the method may include detecting, by a remote control, selection of a command. In block 804, the method may include generating, by the remote control, a command packet for the command. The command packet may comprise an end sentinel and an identifier data sequence, wherein the identifier data sequence is located subsequent to the end sentinel in the command packet and comprises remote control address data of the remote control. In block 806, the method may include causing transmission (e.g., IR transmission) of the command packet to a device.

In block 808, the method may include receiving, by the remote control, a pairing request (e.g., sent via a radio frequency transmission) comprising the remote control address data and device address data. In block 810, the method may include causing transmission (e.g., IR transmission) of a pairing response message to establish a communication session with the device. In an example, the remote control 110 may process keyed in data prior to communicating the pairing response message. In another example, the remote control 110 may exchange keys with the device for encrypting messages sent as part of the communication session between the remote control and the device. In a further example, subsequent to the establishing the communication session, the remote control 110 may communicate a command packet (e.g., via infrared transmission) to the device and may process an acknowledgement sent by the device (e.g., via RF) in response to the command packet. The method may then end or return to any of the preceding blocks.

Figure 9:
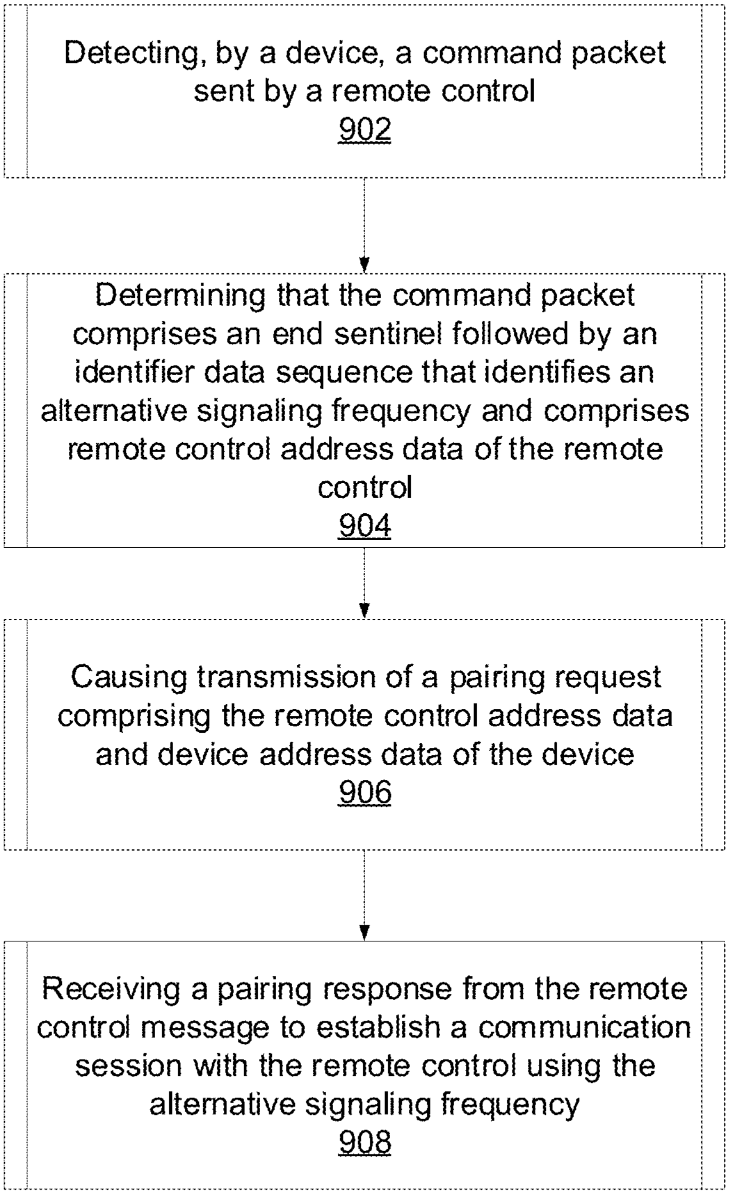
FIG. 9 illustrates an example flow diagram of a method for establishing a communication session with a remote control by a device in accordance with an aspect of the disclosure.

Referring to FIG. 9, this figure illustrates an example flow diagram of a method for establishing a communication session with a remote control by a device. The method may be implemented by a display device, such as, for example, a television, a 3D display device 102, or a set top box, and may begin at block 902. In block 902, the method may include detecting, by a device, a command packet sent (e.g., via infrared transmission) by a remote control. In block 904, the method may include determining that the command packet comprises an end sentinel followed by an identifier data sequence that identifies an alternative signaling frequency and comprises remote control address data of the remote control.

In block 906, the method may include causing transmission (e.g., radio frequency transmission) of a pairing request comprising the remote control address data and device address data of the device. In block 908, the method may include receiving a pairing response message from the remote control (e.g., via infrared) to establish a communication session with the remote control. In an example, the device may exchange keys with the remote control 110 for encrypting messages to be sent as part of the communication session established between the remote control and the device using the alternative signaling frequency. In another example, subsequent to the establishing the communication session, the device may receive a command packet (e.g., via infrared) from the remote control 110 and may respond with an acknowledgement sent via RF. The method may then end, or return to one of the previous blocks.

Figure 10:
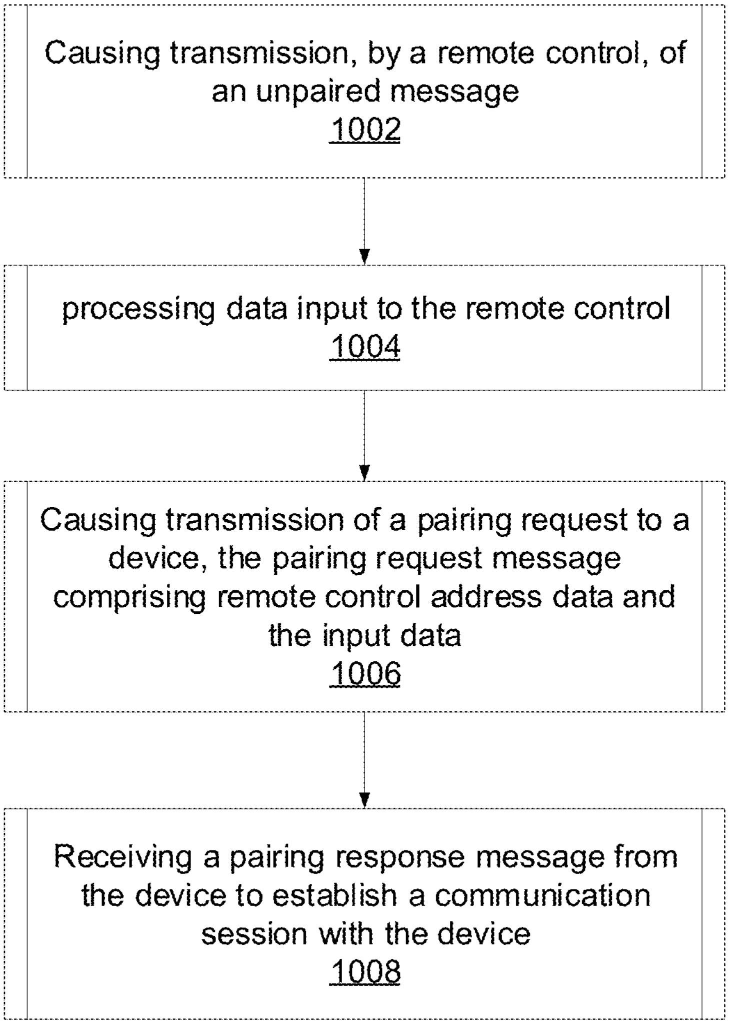
FIG. 10 illustrates an example flow diagram of a method for establishing a communication session in response to communication of an unpaired message in accordance with an aspect of the disclosure.

Referring to FIG. 10, this figure illustrates an example flow diagram of a method for establishing a communication session in response to communication of an unpaired message. The method may be implemented by a remote control 110 and may begin at block 1002. In block 1002, the method may include causing transmission, by a remote control, of an unpaired message. For example, the remote control 110 may periodically cause transmission of the unpaired message to any device within range until the communication session is established or may cause transmission of the unpaired message in response to user input. In block 1004, the method may include processing data input to the remote control. In block 1006, the method may include causing transmission of a pairing request to a device, the pairing request message comprising remote control address data and the input data. In block 1008, the method may include receiving a pairing response message from the device to establish a communication session with the device. For example, the communication session may be established to permit the remote control and the device to communicate using RF transmissions. The method may then end, or return to one of the previous blocks.

One or more aspects of the above examples may be embodied in computer-executable instructions, such as in one or more program modules, executed by one or more computers or other devices such as by any of the blocks in the figures. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

The invention claimed is:

1. A method comprising:
- sending, by a remote control device and to a computing device, a data packet comprising:
  - identifier data that identifies an alternative signaling frequency, wherein the identifier data is located subsequent to an end marker in the data packet, and
  - address data of the remote control device;
- receiving, by the remote control device, a pairing request comprising:
  - the address data of the remote control device, and
  - address data of the computing device;
- sending, by the remote control device, a pairing response message; and
- based on the pairing response message, establishing a communication session, with the computing device, using the alternative signaling frequency.

2. The method of claim 1, wherein the receiving comprises receiving, via a first signaling frequency, the pairing request, and wherein the sending the pairing response message comprises sending, via a second signaling frequency, the pairing response message.

3. The method of claim 1, wherein the computing device comprises a display device.

4. The method of claim 1, further comprising:
- sending, after the establishing the communication session and using the alternative signaling frequency, a second data packet comprising a user selection of a command for the computing device.

5. The method of claim 1, wherein the establishing comprises receiving an encryption key.

6. The method of claim 1, wherein the sending the data packet comprises sending, via infrared transmission, the data packet.

7. The method of claim 1, wherein the data packet comprises a radio frequency discovery request to initiate pairing with a display device that communicates via a radio frequency.

8. A remote control device comprising:
- one or more processors; and
- memory storing instructions that, when executed by the one or more processors, cause the remote control device to:
  - send, to a computing device, a data packet comprising:
    - identifier data that identifies an alternative signaling frequency, wherein the identifier data is located subsequent to an end marker in the data packet, and
    - address data of the remote control device;
  - receive a pairing request comprising:
    - the address data of the remote control device, and
    - address data of the computing device;
  - send a pairing response message; and
  - based on the pairing response message, establish a communication session, with the computing device, using the alternative signaling frequency.

9. The remote control device of claim 8, wherein the instructions, when executed by the one or more processors, cause the remote control device to:
- receive the pairing request by receiving, via a first signaling frequency, the pairing request; and
- send the pairing response message by sending, via a second signaling frequency, the pairing response message.

10. The remote control device of claim 8, wherein the computing device comprises a display device.

11. The remote control device of claim 8, wherein the instructions, when executed by the one or more processors, cause the remote control device to:
- send, after the establishing the communication session and using the alternative signaling frequency, a second data packet comprising a user selection of a command for the computing device.

12. The remote control device of claim 8, wherein the instructions, when executed by the one or more processors, cause the remote control device to establish the communication session by receiving an encryption key.

13. The remote control device of claim 8, wherein the instructions, when executed by the one or more processors, cause the remote control device to send the data packet by sending, via infrared transmission, the data packet.

14. The remote control device of claim 8, wherein the data packet comprises a radio frequency discovery request to initiate pairing with a display device that communicates via a radio frequency.

15. A non-transitory computer-readable medium storing instructions that, when executed, cause:
- sending, by a remote control device and to a computing device, a data packet comprising:
  - identifier data that identifies an alternative signaling frequency, wherein the identifier data is located subsequent to an end marker in the data packet, and
  - address data of the remote control device;
- receiving, by the remote control device, a pairing request comprising:
  - the address data of the remote control device, and
  - address data of the computing device;
- sending, by the remote control device, a pairing response message; and
- based on the pairing response message, establishing a communication session, with the computing device, using the alternative signaling frequency.

16. The non-transitory computer-readable medium of claim 15, wherein the instructions, when executed, cause:
- the receiving by causing receiving, via a first signaling frequency, the pairing request; and
- the sending the pairing response message by causing sending, via a second signaling frequency, the pairing response message.

17. The non-transitory computer-readable medium of claim 15, wherein the computing device comprises a display device.

18. The non-transitory computer-readable medium of claim 15, wherein the instructions, when executed, further cause:
- sending, after the establishing the communication session and using the alternative signaling frequency, a second data packet comprising a user selection of a command for the computing device.

19. The non-transitory computer-readable medium of claim 15, wherein the instructions, when executed, cause the establishing by causing receiving an encryption key.

20. The non-transitory computer-readable medium of claim 15, wherein the instructions, when executed, cause the sending the data packet by causing sending, via infrared transmission, the data packet.

21. The non-transitory computer-readable medium of claim 15, wherein the data packet comprises a radio frequency discovery request to initiate pairing with a display device that communicates via a radio frequency.

* * * * *